Figure 1:
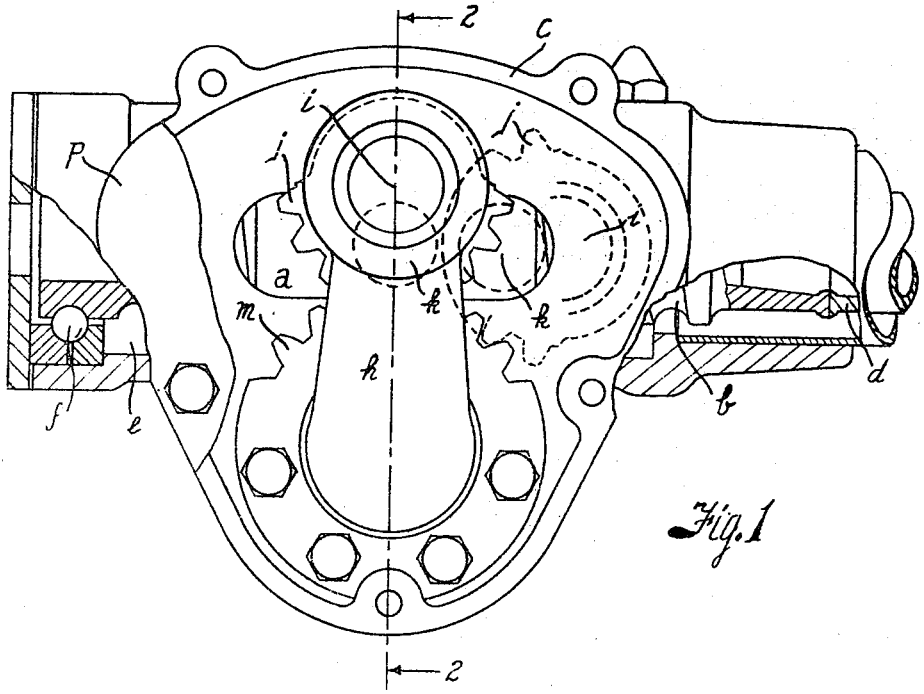

Inventor
John George Douglas
By
Attorneys

Patented Aug. 10, 1948

2,446,911

UNITED STATES PATENT OFFICE 2,446,911

MECHANISM FOR TRANSFORMING LINEAR MOVEMENT OF ONE MEMBER INTO ARCUATE OR ANGULAR MOVEMENT OF ANOTHER MEMBER OR VICE VERSA WITH PARTICULAR REFERENCE TO SCREW AND NUT TYPE STEERING GEARS

John George Douglas, Aberfeldy, Scotland

Application February 1, 1945, Serial No. 575,670
In Great Britain February 7, 1944

8 Claims. (Cl. 74—499)

This invention relates to transmission mechanism of the kind wherein a single rocker arm or lever is adapted to be angularly displaced by movement of an associated member, such angular displacement being utilised to actuate or control movable components such, for example, as automobile road wheels, ships' rudders, aircraft rudders, ailerons, landing gear and bomb-bay doors. The invention has particular application to automobile steering gears which employ transmission devices of the screw and nut type wherein a rocker arm adapted to be actuated by the nut is connected to a drop arm or equivalent device for transmitting steering movements to the road wheels.

The object of the present invention is to provide an improved and simplified transmission mechanism of the kind and for the purposes above indicated and which possesses the advantages that—a short pitch and low helix angle can be used in the input device; the number of rotations of the input device between extreme angular positions of the rocker arm can be reduced; the effects on the input device of backward forces operating on the drop arm or its equivalent can be prevented to a substantial degree; the amount of wear between the moving and stationary parts of the mechanism can be reduced; and to enable certain desirable movement relations, leverages and the like, such as increased mechanical advantage, to be simply and efficiently obtained, particularly a high ratio or small number of turns of the input device when the rocker arm is at and near its median angular position but without liability to excessive backward forces on said device at this or any other position of rocker arm.

According to the invention a screw and nut transmission mechanism is provided of the kind wherein the translative movement of the nut is applied to the arcuately movable part of an output rocking arm characterised by the provision of means to compensate for the arcuate movement of said rocking arm whilst said means also prevent rotation of the nut to any substantial degree during its movement of translation.

According to one form of the invention a screw and nut transmission mechanism of the kind wherein movement of the nut is applied to the arcuately movable part of an output rocking arm is characterised by the provision of interengaging means between said nut and said arm and compensating means carried by said arm whereby the said interengaging means takes a substantially straight line path during the translative movement of the nut.

According to another form of the invention a screw and nut transmission mechanism of the kind wherein the axially translative movement of the nut is applied to the arcuately movable part of a pivoted output element is characterised by a pin or stud adapted to engage an aperture in the nut, the said pin or stud being carried eccentrically in a toothed component movably mounted on the said output element and meshing with a fixed toothed component for the purpose of causing movement of the said pin or stud in a direction to follow or produce axial movement of the said nut.

Figure 2:
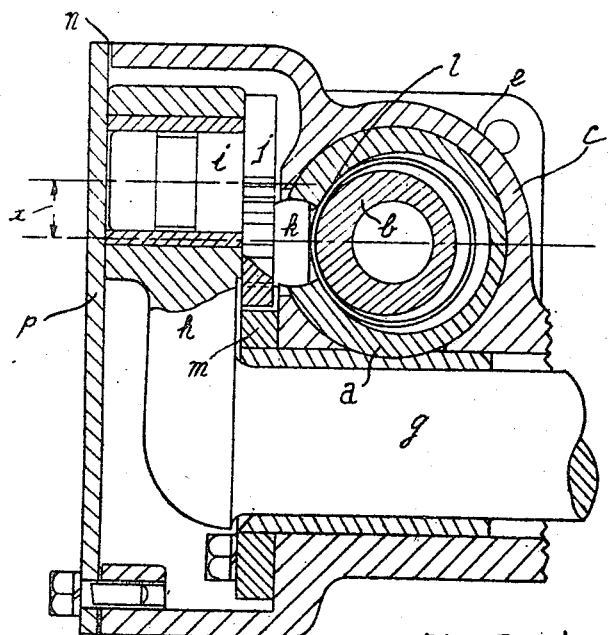
Figure 5:
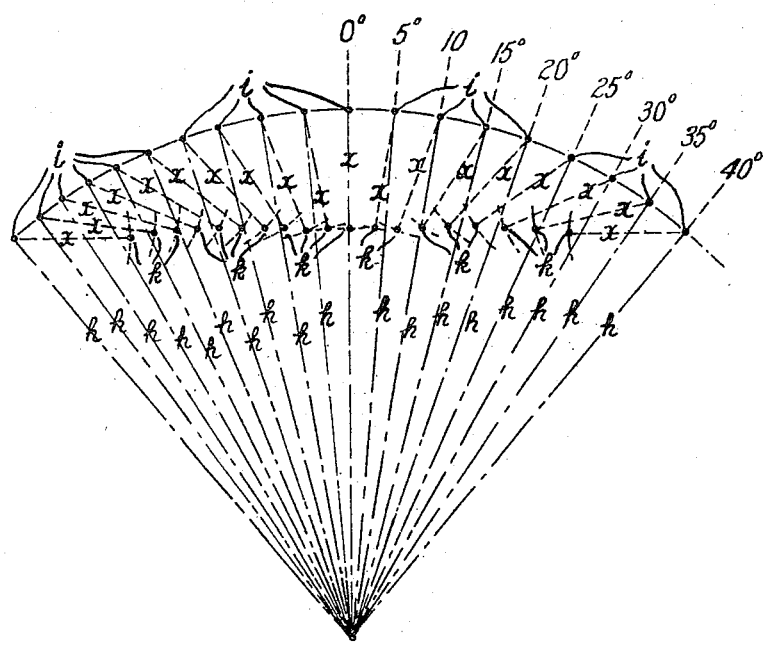
Figure 3:
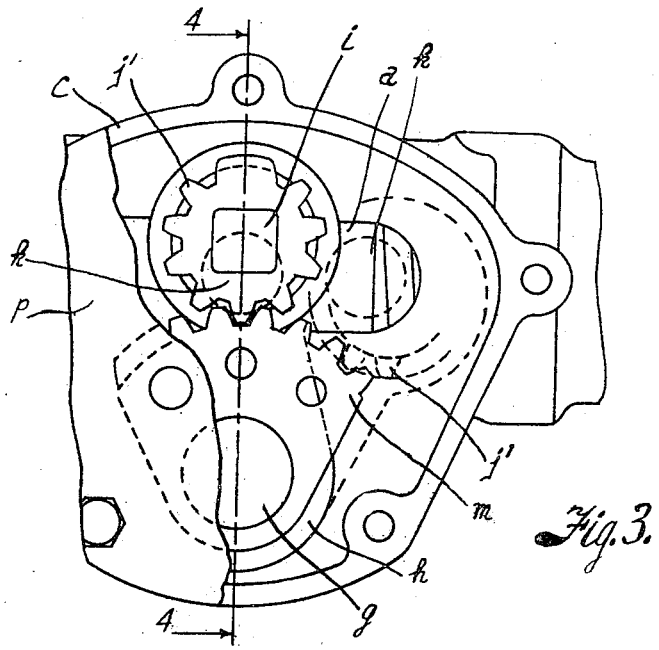
Figure 4:
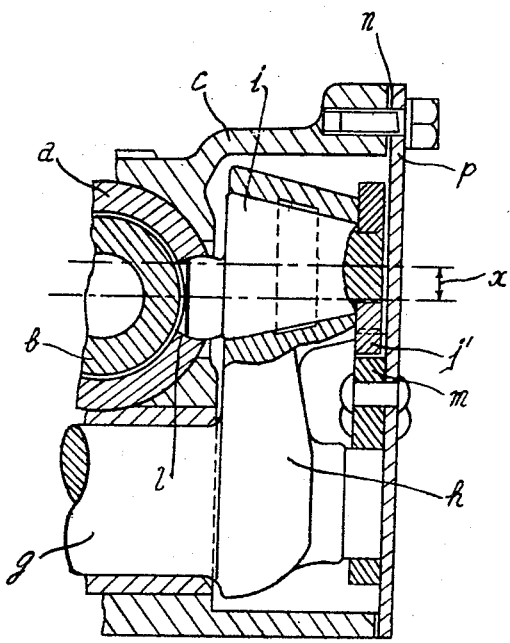

Reference will now be made to the accompanying drawings which illustrate by way of example constructions according to the invention and in which:

Fig. 1 is a side elevation of one form of the improved screw and nut transmission gear with the cover plate partly removed, Fig. 2 is a cross sectional elevation taken on the line 2—2 of Fig. 1, Fig. 3 is a side elevation of an alternative form of construction with the cover plate partly broken away, Fig. 4 is a cross sectional elevation taken on the line 4—4 of Fig. 3, and Fig. 5 is a diagram to illustrate the movement transmitted by the mechanism according to the invention.

Referring first to Figs. 1 and 2, the transmission mechanism comprises a nut $a$ mounted on the screw-threaded end $b$ of an input shaft $d$ which may be the operating shaft of a steering gear. The nut $a$ is mounted so as to slide in the manner of a piston in a bore $e$ formed in an outer casing $c$. There is also mounted within the housing $c$ a double thrust bearing $f$ for the shaft $d$ and its screw-threaded portion $b$, or, alternatively, when the invention is applied to a steering gear, this bearing may be disposed at or near the upper end of the steering column or shaft in place of the more usual journal bearing at that point. One side of the nut $a$ is formed with a hole or recess $l$ in which engages a peg $k$ of partially spherical shape, as shown in Fig. 2 which is carried eccentrically on the inner face of a control gear or sector $j$ which in turn is part of or mounted on a spindle $i$ rotatably carried in the head or outer end of a rocker arm $h$ formed integral with or fixed to a rocker shaft $g$ which forms the output shaft of the mechanism and is mechanically connected to the drop arm or other device through which movement is transmitted to the mechanism to be actuated or controlled. The rotatable spindle $i$ is disposed with its axis parallel to the axis of the rocker shaft $g$ and the tooth pitch circle of the control gear $j$ is concentric with the axis of the spindle $i$. The toothed gear or sector $j$ meshes with a toothed gear $m$ fast to the inner face of the chamber or housing $c$ with its tooth pitch circle concentric with the axis of the rocker shaft $g$. The parts are arranged so that when the rocker arm $h$ is in the central position shown in Fig. 1, the axes of the peg $k$, spindle $i$ and rocker shaft $g$ all lie on a straight line at right angles to the axis of the nut $a$.

When rotary movement is applied to the shaft $d$ and screw $b$ the nut $a$ moves axially, but is restrained from rotating by its engagement with the peg $k$ which travels towards the one side or other of the central position of the arm $h$ which is thereby caused to move angularly and impart a partial rotary movement to the rocker shaft $g$ and operate the mechanism under control.

When the rocker arm $h$ moves as above described, the control gear $j$ rolls upon and in mesh with the fixed gear $m$ so that the spindle $i$ is caused to rotate in the head of the rocker arm $h$ in planet wheel or epicyclic manner. The axis of the peg $k$ is also caused to move and rotate around the axis of the spindle $i$ at radius $x$ and become out of line with the axes of spindle $i$ and rocker shaft $g$ and this movement increases its distance or radius from the axis of the rocker shaft $g$. The extent of rotation of spindle $i$ and, therefore, of the increase of radius from the axis of the peg $k$ to the axis of the rocker shaft $g$ is proportional to the extent of angular movement of the rocker arm $h$, and according to the dimensions of the associated parts of the construction described and the gear pitch circles, this increase of radius can be arranged so that the path through which the axis of the peg $k$ travels and, therefore, the path of recess $l$ in the periphery of the nut is substantialy a straight line running parallel with the axis of the nut irrespective of the arcuate path followed by the head of the rocker arm $h$ and the spindle $i$. Therefore, as shown in the diagram Fig. 5 substantially no rotation of the nut $a$ occurs throughout its axial travel.

A further result obtained by the arrangement described is that the leverage radius from the axis of the peg $k$ to the axis of the rocker shaft $g$ remains at substantially all positions of the rocker arm $h$ equal to its value at the median or ahead position, and accordingly when the invention is applied to a steering gear no loss of leverage occurs towards or at the full lock positions nor at any part of the gear movement.

Simultaneously with the operations above described and also owing to the eccentric rotation of the peg axis about the spindle axis, the rocker arm $h$ becomes angularly advanced ahead of the peg $k$ by a maximum of radius $x$ and to an extent governed by the extent of rotation which is in turn governed by the extent of angular displacement of the rocker arm $h$ from the median position illustrated. The said advancement or gain of the position of the rocker arm $h$ relative to the peg $k$ at the median position is nil but becomes maximum at or before the lock positions, this result being shown in the broken line positions in Fig. 1 and also in the diagram Fig. 5.

Simultaneously with the two actions above described the total travel of the nut $a$ required to impart the desired large extent of angular movement to the rocker arm $h$ is substantially reduced because the rocker arm $h$ is advanced beyond, or gains over, the peg $k$ by an amount which may be equal to twice the radius $x$, and as the peg $k$ only is connected to the nut $a$ and alone determines its axial travel, the total travel of the nut $a$ is also reduced by a linear distance which may be equal to twice the radius or amount $x$. This result is also plotted in Fig. 5 from which it will be seen that the extent or radius $x$ by which the axes of spindle $i$ and peg $k$ are non-coincident provides an axial travel of the nut $a$ equivalent to displacing the peg $k$ through 58 degrees with a displacement of the rocker arm $h$ through 80 degrees of total angular movement.

In the construction shown in Figs. 3 and 4 the spindle $i$ is of conical form and has a control gear $j'$ fast to its outer end meshing with a toothed sector $m$ which is fixed to the inner face of the cover plate $p$ of the housing $c$. The arrangement and operation are otherwise similar to that of the arrangement shown in Figs. 1 and 2.

In both forms of the invention axial or endwise adjustment of the rocker shaft $g$ and its associated parts may be effected by means of shims $n$ inserted between the cover plate $p$ and the housing $c$, the effect of this insertion being to keep the peg $k$ snugly engaged in the recess $l$ and also to keep the back face of the control gear $j$ and the inner face of the rocker arm $h$ in close contact. Alternatively, a pressure-screw in cover plate $p$ lineable with axis of shaft $g$ may be used.

In the arrangement of Figs. 3 and 4 the said axial adjustment of the rocker shaft will also serve to take up any play or wear between the spindle $i$ and its bearing in the head of the rocker arm $h$.

When either form of the invention above described is applied to a vehicle steering gear and other mechanisms, a short pitch and low helix angle can be used in the screw and nut without an unduly large ratio or number of turns of the hand steering wheel or other control element from lock to lock and without undue restriction of the angular movement imparted to the rocker arm $h$, but the ratio at and near the median position of rocker arm is geared-up appreciably above the normal or overall ratio of the short pitch and low helix-angle which nevertheless remains operative against backward forces at the median and all other angular positions of the rocker arm. A desirable increase in mechanical advantage from the hand steering wheel or other input device is also obtained while the rocker arm $h$ is moving towards and at the full lock positions. By reducing the amount of travel of the nut to the minimum and thereby avoiding the necessity for a long pitch screw and a high helix angle undue kick-back at the hand steering wheel or other control element caused by road shocks or other backward forces operating at the drop arm or its equivalent is also prevented. In certain applications of the invention, the operation of the devices described would be reversed, the input shaft $d$ becoming the output shaft.

It is to be understood that various modifications may be made in the constructional details of the devices above described without departing from the invention. For example, the screw and nut may be and preferably are of the recirculating ball type described in my prior U. S. Patent No. 2,322,000, granted June 15, 1943. Further, the casing $c$ may also support bearings of known type for the screw-threaded portion $b$ of the shaft $d$ in which case the nut $a$ may be a clearance fit in the casing $c$.

I claim:

1. A vehicle steering gear including a screw-threaded spindle actuated by a steering wheel, a nut adapted to be moved axially by rotary movements of said spindle, a rocker arm through which movement is transmitted to a drop arm or the like of a steering transmission mechanism, a toothed gear rotatably mounted on the free end of said rocker arm, a pin or stud mounted on and eccentrically to the axis of said gear and in permanent engagement with a recess in said nut, and a second toothed member fixed concentrically and immovably around the axis of rotation of the said rocker arm and meshing with the first toothed gear whereby during axial movement of the nut movement is imparted to said rocker arm through the said pin or stud which makes substantially a straight line movement.

2. A screw and nut transmission mechanism, comprising a casing, a screw threaded input shaft rotatably mounted in said casing, a nut capable of axial movement on said shaft, an output shaft mounted in said casing, an arcuately movable rocking arm carried by said output shaft, a pin engaging an aperture in the nut, a toothed component movably mounted on said arm and carrying said pin, and a fixed toothed component meshing with said movable toothed component.

3. A screw and nut transmission mechanism, comprising a casing, a screw rotatably mounted therein, a nut mounted to travel axially along the screw, a shaft rotatably mounted in the casing and having a rocking arm fixed thereto, and connecting means between the nut and rocking arm including epicyclic gearing for holding the nut from rotation and for transmitting motion between the screw and rocking arm.

4. A transmission mechanism according to claim 3, wherein said connecting means comprises a pin carried by said epicyclic gearing and engaging the nut, and said pin is guided by said epicyclic gearing in a substantially rectilinear path during angular movement of said rocking arm.

5. A transmission mechanism according to claim 3, wherein said connecting means comprises a pin carried by said epicyclic gearing and engaging said nut, and said pin is guided by said epicyclic gearing in a substantially rectilinear path during angular movement of said rocking arm, and wherein said pin is disposed relatively to said epicyclic gearing to be nearest to the axis of said shaft while said nut is substantially at the mid-point in its travel along said screw.

6. A screw and nut transmission mechanism, comprising a casing, a screw rotatably mounted therein, a nut mounted to travel axially along the screw, a shaft rotatably mounted in the casing and having an arm fixed thereto, a gear fixed to the casing concentrically of said shaft, a pinion mounted rotatably on said arm and meshing with said gear, and a pin carried by the pinion and engaging the nut, said pin being eccentric to the axis of the pinion and located within the pitch diameter thereof, and disposed between the axes of the pinion and said shaft while the nut is in its mid-position along the screw.

7. A screw and nut transmission mechanism, comprising a casing, a screw rotatably mounted therein, a nut mounted to travel axially along the screw, a shaft rotatably mounted in the casing and having an arm fixed thereto, a gear fixed to the casing concentrically of said shaft, a pinion mounted rotatably on said arm and meshing with said gear, and a pin carried by the pinion eccentrically of its axis and within its pitch diameter and engaging the nut, the axis of the pinion being at a radial distance from the axis of said shaft greater than the radius of said gear, and said pin being disposed between the axes of the pinion and said shaft while the nut is in its mid-position along the screw and disposed at relatively opposite sides of the axis of the pinion while the nut is toward one or the other end of the screw.

8. A screw and nut transmission mechanism, comprising a casing, a screw threaded input shaft rotatably mounted in said casing, a nut mounted on and capable of axially translative movement relatively to said shaft and having a recess in one side thereof, an output shaft mounted in said casing for connection to the component to be actuated or controlled, an arcuately movable rocking arm carried by said output shaft and movable about the axis of the latter as a fixed center relatively to said nut, and rotational driving connections between said nut and said rocking arm which prevent rotation of said nut to any substantial degree during its translative movement, including a toothed member fixed in the casing concentrically to the axis of the output shaft, a second toothed member meshing with the first toothed member and rotatably mounted at the free end of said arm, and a pin or stud mounted eccentrically to the tooth pitch circle of said second toothed member and engaging in said recess in the nut.

JOHN GEORGE DOUGLAS.

REFERENCES CITED

The following references are of record in the file of this patent:

UNITED STATES PATENTS

| Number | Name | Date |
| --- | --- | --- |
| 1,167,330 | Bishop | Jan. 4, 1916 |
| 1,512,424 | Jones | Oct. 21, 1924 |
| 1,967,482 | Schmidt | July 24, 1934 |
| 2,145,751 | Briggs | Jan. 31, 1939 |
| 2,159,225 | Phelps | May 23, 1939 |
| 2,233,248 | Douglas | Feb. 25, 1941 |

FOREIGN PATENTS

| Number | Country | Date |
| --- | --- | --- |
| 442,414 | France | June 20, 1912 |